(12) United States Patent
Laredo

(10) Patent No.: US 8,475,691 B2
(45) Date of Patent: *Jul. 2, 2013

(54) UV-ABSORBERS FOR OPHTHALMIC LENS MATERIALS

(75) Inventor: Walter R. Laredo, Fort Worth, TX (US)

(73) Assignee: Novartis AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,892

(22) Filed: Aug. 14, 2012

(65) Prior Publication Data

US 2013/0043443 A1 Feb. 21, 2013

Related U.S. Application Data

(60) Provisional application No. 61/523,596, filed on Aug. 15, 2011.

(51) Int. Cl.
| | |
|---|---|
| *F21V 9/04* | (2006.01) |
| *F21V 9/06* | (2006.01) |
| *G02B 5/22* | (2006.01) |
| *G02B 5/26* | (2006.01) |
| *C09B 29/00* | (2006.01) |

(52) U.S. Cl.
USPC ............ 252/589; 252/586; 523/106; 534/851

(58) Field of Classification Search
USPC ... 252/183.11, 586, 589; 351/159; 424/78.04; 514/912; 523/107, 106; 548/255, 257, 259, 548/260, 261; 623/6.11; 534/851
See application file for complete search history.

(56) References Cited

U.S. PATENT DOCUMENTS

| | | | |
|---|---|---|---|
| 5,290,892 A | 3/1994 | Namdaran et al. | |
| 5,331,073 A | 7/1994 | Weinschenk, III et al. | |
| 5,470,932 A | 11/1995 | Jinkerson | |
| 5,528,322 A | 6/1996 | Jinkerson | |
| 5,543,504 A | 8/1996 | Jinkerson | |
| 5,662,707 A | 9/1997 | Jinkerson | |
| 5,693,095 A | 12/1997 | Freeman et al. | |
| 6,528,602 B1 | 3/2003 | Freeman et al. | |
| 6,806,337 B2 | 10/2004 | Schlueter et al. | |
| 6,846,897 B2 | 1/2005 | Salamone et al. | |
| 6,852,793 B2 | 2/2005 | Salamone et al. | |
| 6,872,793 B1 | 3/2005 | Schlueter | |
| 7,037,954 B2 | 5/2006 | Baba et al. | |
| 7,067,602 B2 | 6/2006 | Benz et al. | |
| 7,101,949 B2 | 9/2006 | Salamone et al. | |
| 7,119,210 B2 | 10/2006 | Schlueter | |
| 7,396,942 B2 | 7/2008 | Schuleter | |
| 7,691,918 B2 | 4/2010 | Jinkerson et al. | |
| 7,709,652 B2 | 5/2010 | Schlueter et al. | |
| 7,728,051 B2 | 6/2010 | Weinschenk, III et al. | |
| 7,781,571 B2 | 8/2010 | Weinschenk, III et al. | |
| 7,803,359 B1 | 9/2010 | Jinkerson et al. | |
| 7,884,228 B1 | 2/2011 | Laredo | |
| 7,909,458 B2 | 3/2011 | Schlueter | |
| 7,947,849 B2 | 5/2011 | Laredo | |
| 8,043,607 B2 | 10/2011 | Jinkerson | |
| 8,115,009 B2 | 2/2012 | Schlueter | |
| 8,119,830 B2 | 2/2012 | Schlueter | |
| 8,153,703 B2 | 4/2012 | Laredo | |
| 8,207,244 B2 * | 6/2012 | Laredo | 523/106 |
| 8,236,053 B1 | 8/2012 | Freeman | |
| 8,262,948 B2 * | 9/2012 | Laredo et al. | 252/586 |

(Continued)

*Primary Examiner* — Bijan Ahvazi

(74) *Attorney, Agent, or Firm* — Patrick M. Ryan

(57) ABSTRACT

Novel UV absorbing monomers are disclosed. The UV absorbers are particularly suitable for use in intraocular lens materials.

16 Claims, 1 Drawing Sheet

Example 3A (~1 mm Thick Sample)

U.S. PATENT DOCUMENTS

| | | |
|---|---|---|
| 2009/0082553 A1 | 3/2009 | Satake et al. |
| 2009/0248150 A1 | 10/2009 | Lehman |
| 2010/0113641 A1 | 5/2010 | Laredo |
| 2011/0004301 A1 | 1/2011 | Laredo |
| 2011/0178202 A1 | 7/2011 | Laredo |
| 2011/0245818 A1 | 10/2011 | Weinschenk, III |
| 2011/0245919 A1 | 10/2011 | Pettit |
| 2011/0266505 A1 | 11/2011 | Laredo et al. |
| 2011/0272645 A1 | 11/2011 | Jinkerson |
| 2012/0142877 A1 | 6/2012 | Laredo |

* cited by examiner

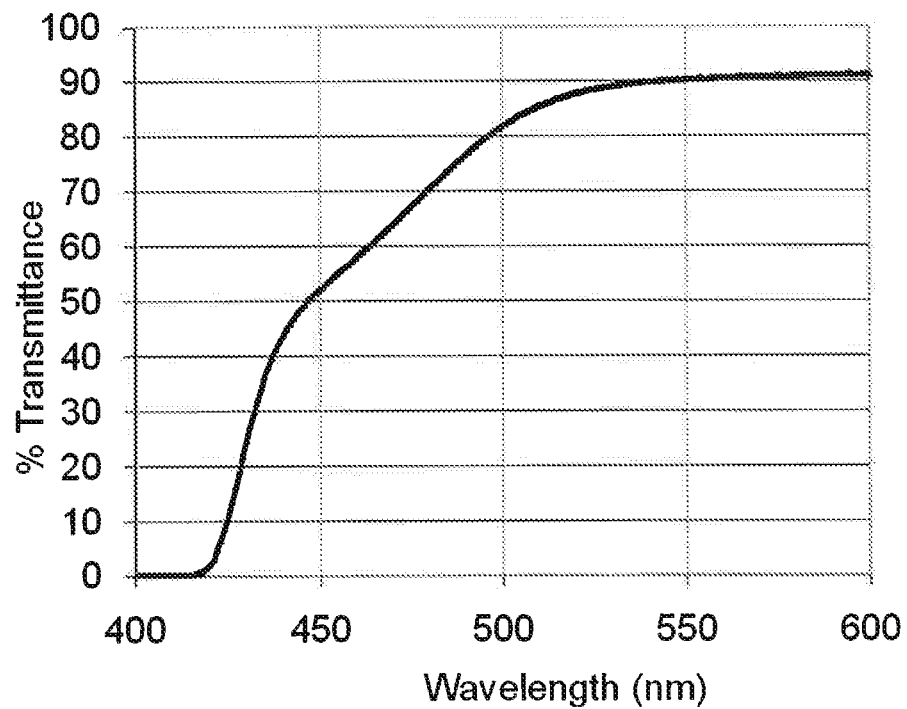

UV-ABSORBERS FOR OPHTHALMIC LENS MATERIALS

CROSS-REFERENCE TO RELATED APPLICATIONS

This application claims priority under 35 U.S.C. §119 to U.S. Provisional Patent Application No. 61/523,596, filed Aug. 15, 2011, the entire contents of which are incorporated herein by reference.

FIELD OF THE INVENTION

This invention is directed to ultraviolet light absorbers. In particular, is this invention relates to UV light absorbers that also block a portion of visible light.

BACKGROUND OF THE INVENTION

Many ultraviolet and visible light absorbers are known as ingredients for polymeric materials used to make ophthalmic lenses. Such absorbers are preferably covalently bound to the polymeric network of the lens material instead of simply physically entrapped in the material to prevent them from migrating, phase separating or leaching out of the lens material. Such stability is particularly important for implantable ophthalmic lenses where the leaching of the absorber may present both toxicological issues and lead to the loss of UV/visible blocking activity in the implant.

Numerous copolymerizable benzatriazole, benzophenone and triazine absorbers are known. Most of these compounds are known as UV absorbers, though some may be known to also absorb some portion of visible light. Many absorbers contain conventional olefinic polymerizable groups, such as methacrylate, acrylate, methacrylamide, acrylamide or styrene groups. Copolymerization with other ingredients in the lens materials, typically with a radical initiator, incorporates the absorbers into the resulting polymer chain. Incorporation of additional functional groups on an absorber may influence one or more of the absorber's light-absorbing properties, solubility or reactivity. If the absorber does not have sufficient solubility in the remainder of the ophthalmic lens material ingredients or polymeric lens material, the absorber may coalesce into domains that could interact with light and result in decreased optical clarity of the lens.

Examples of polymeric ophthalmic lens materials that incorporate UV absorbers can be found in U.S. Pat. Nos. 5,290,892; 5,331,073 and 5,693,095.

SUMMARY OF THE INVENTION

The present invention provides novel UV light absorbing monomers. These UV absorbers are suitable for use in ophthalmic lenses, including contact lenses. They are particularly useful in implantable lenses, such as intraocular lenses (IOLs).

BRIEF DESCRIPTION OF THE DRAWING

FIG. 1 shows the UV/Vis is spectrum of formulation 3A.

DETAILED DESCRIPTION OF THE INVENTION

Unless indicated otherwise, all ingredient amounts expressed in percentage terms are presented as % w/w.

The UV absorbers of the present invention are represented by the formula:

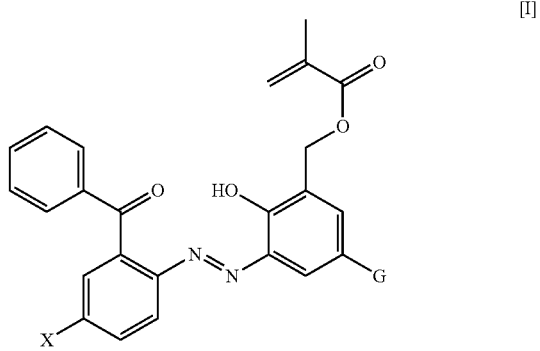

[I]

wherein
X and G are independently H, F, Cl, Br, I $CH_3$, $CO_2H$, $NO_2$, $C_1$-$C_6$ linear or branched alkyl, or $C_1$-$C_6$ linear or branched alkoxy.

Preferred UV absorbers of the present invention are those wherein
X is H, F, Cl, $CH_3$, or $NO_2$; and
G is H, F, Cl, $CH_3$, or $CH_3O$; provided that if X=H, then G≠H.

Most preferably, X is Cl and G is $CH_3$.

The synthesis of the UV absorbers of the present invention is described below. The UV absorbers are synthesized in 3 steps.

In Steps 1-2, the diazonium salt of an amine-functionalized benzophenone is prepared and subsequently reacted with a desired hydroxyl-functionalized phenol compound to form a hybrid compound which contains a benzophenone and azo moiety.

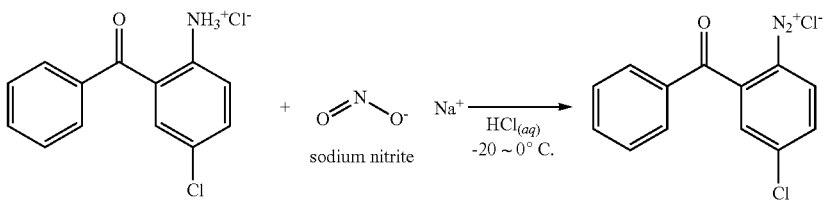

Step 1

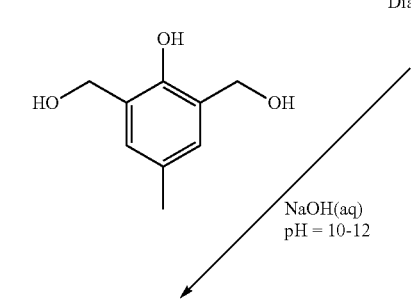

-continued

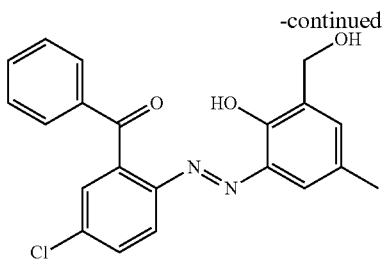

Step 2

In step 3, the pendant hydroxyl group of the benzophenone-azo compound is esterified to form a polymerizable compound containing a (meth)acrylate group. The (meth)acrylate group can then form covalent bonds when reacted with vinyl monomers, co-monomers, macromers, crosslinking agents, and other components typically used in making polymer-based ocular materials, particularly acrylic IOLs.

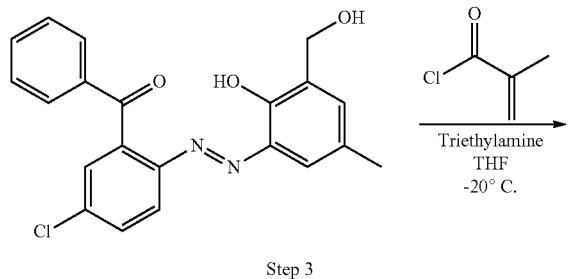

Step 3

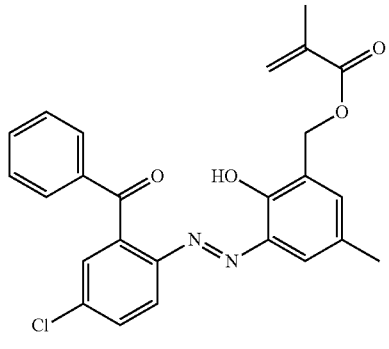

Compound 1

The absorption profiles of the disclosed UV absorbers can be tailored by the choice of the X and G substituents on the aromatic ring system.

The UV absorbers of the present invention are particularly suitable for use in IOLs, IOL materials will generally contain from 0.01 to 0.5% (w/w) of a UV absorber of the present invention. Preferably, IOL materials will contain from 0.01 to 0.1% (w/w) of a UV absorber of the present invention. Such device materials are prepared by copolymerizing the UV absorbers of the present invention with other ingredients, such as device-forming materials, cross-linking agents, and blue-light blocking chromophores.

Many device-forming monomers are known in the art and include both acrylic and silicone-containing monomers among others. See, for example, U.S. Pat. Nos. 7,101,949; 7,067,602; 7,037,954; 6,872,793 6,852,793; 6,846,897; 6,806,337; 6,528,602; and 5,693,095. In the case of IOLs, any known IOL device material is suitable for use in the compositions of the present invention. Preferably, the ophthalmic device materials comprise an acrylic or methacrylic device-forming monomer. More preferably, the device-forming monomers comprise a monomer of formula [II]:

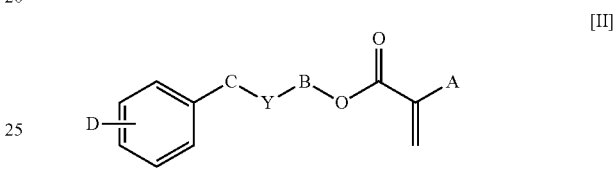

where in formula [II]:
A is H, $CH_3$, $CH_2CH_3$, or $CH_2OH$;
B is $(CH_2)_m$ or $[O(CH_2)_2]_z$;
C is $(CH_2)_w$;
m is 2-6;
z is 1-10;
Y is nothing, O, S, or NR', provided that if Y is O, S, or NR', then B is $(CH_2)_m$;
R' is H, $CH_3$, $C_nH_{2n'+1}$ (n'=1-10), iso-$OC_3H_7$, $C_6H_5$, or $CH_2C_6H_5$;
w is 0-6, provided that m+w≦8; and
D is H, $C_1$-$C_4$ alkyl, $C_1$-$C_4$ alkoxy, $C_6H_5$, $CH_2C_6H_5$ or halogen.

Preferred monomers of formula [II] are those wherein A is H or $CH_3$, B is $(CH_2)_m$, m is 2-5, Y is nothing or O, w is 0-1, and D is H. Most preferred are 2-phenylethyl methacrylate; 4-phenylbutyl methacrylate; 5-phenylpentyl methacrylate; 2-benzyloxyethyl methacrylate; and 3-benzyloxypropyl methacrylate; and their corresponding acrylates.

Monomers of formula [II] are known and can be made by known methods. For example, the conjugate alcohol of the desired monomer can be combined in a reaction vessel with methyl methacrylate, tetrabutyl titanate (catalyst), and a polymerization inhibitor such as 4-benzyloxy phenol. The 2; vessel can then be heated to facilitate the reaction and distill off the reaction by-products to drive the reaction to completion. Alternative synthesis schemes involve adding methacrylic acid to the conjugate alcohol and catalyzing with a carbodiimide or mixing the conjugate alcohol with methacryloyl chloride and a base such as pyridine or triethylamine.

Device materials generally comprise a total of at least about 75%, preferably at least about 80%, of device-forming monomers.

In addition to a UV absorber of the present invention and a device-forming monomer, the device materials of the present invention generally comprise a cross-linking agent. The cross-linking agent used in the device materials of this invention may be any terminally ethylenically unsaturated compound having more than one unsaturated group. Suitable cross-linking agents include, for example: ethylene glycol dimethacrylate; diethylene glycol dimethacrylate; allyl methacrylate; 1,3-propanediol dimethacrylate; 2,3-propanediol dimethacrylate; 1,6-hexanediol dimethacrylate; 1,4-butanediol dimethacrylate; $CH_2=C(CH_3)C(=O)O-(CH_2CH_2O)_p-C(=O)C(CH_3)=CH_2$ where p=1-50; and $CH_2=C(CH_3)C(=O)O(CH_2)_tO-C(=O)C(CH_3)=CH_2$ where t=3-20; and their corresponding acrylates. A preferred cross-linking monomer is $CH_2=C(CH_3)C(=O)O-(CH_2CH_2O)_p-C(=O)C(CH_3)=CH_2$ where p is such that the number-average molecular weight is about 400, about 600, or about 1000.

Generally, the total amount of the cross-linking component is at least 0.1% by weight and, depending on the identity and concentration of the remaining components and the desired physical properties, can range to about 20% by weight. The preferred concentration range for the cross-linking component is 0.1-17% (w/w).

Suitable polymerization initiators for device materials containing a UV absorber of the present invention include thermal initiators and photoinitiators. Preferred thermal initiators include perm free-radical initiators, such as t-butyl (peroxy-2-ethyl)hexanoate and di-(tert-butylcyclohexyl) peroxydicarbonate (commercially available as Perkadox® 16 from Akzo Chemicals Inc., Chicago, Ill.). Initiators are typically present in an amount of about 5% (w/w) or less. Because free-radical initiators do not become chemically a part of the polymers formed, the total amount of initiator is customarily not included when determining the amounts of other ingredients.

The device materials containing a UV absorber of the present invention may also contain other reactive UV absorbers and/or reactive colorants. Many reactive (copolymerizable) UV absorbers suitable for use in implantable ophthalmic lenses and devices are known and include 2-(2'-hydroxy-3'-methallyl-5'-methylphenyl)benzotriazole, commercially available as o-Methallyl Tinuvin P ("oMTP") from Polysciences, Inc., Warrington, Pa., as well as those disclosed in U.S. Published Application No. 2010/0113641. UV absorbers are typically present in intraocular lens materials in an amount from about 0.1-5%. Suitable reactive colorants include those described in U.S. Pat. No. 5,470,932. Reactive colorants are typically present in an amount from about 0.01-0.5%. When used to make IOLs, the device materials of the present invention preferably contain at least one reactive UV absorber other than a UV absorber of formula [I].

IOLs constructed of the materials of the present invention can be of any design capable of being rolled or folded into a small cross section that can fit through a relatively smaller incision. For example, the IOLs can be of what is known as a one piece or multipiece design, and comprise optic and haptic components. The optic is that portion which serves as the lens. The haptics are attached to the optic and hold the optic in its proper place in the eye. The optic and haptic(s) can be of the same or different material. A multipiece lens is so called because the optic and the haptic(s) are made separately and then the haptics are attached to the optic. In a single piece lens, the optic and the haptics are formed out of one piece of material. Depending on the material, the haptics are then cut, or lathed, out of the material to produce the IOL.

In addition to IOLs, the materials of the present invention are also suitable for use in other ophthalmic devices, such as contact lenses, keratoprostheses, and corneal inlays or rings.

The invention will be further illustrated by the following examples, which are intended to be illustrative, but not limiting.

Example 1

Synthesis of (E)-(5-chloro-2-((2-hydroxy-3-(hydroxymethyl)-5-methylphenyl)diazenyl)phenyl)-(phenyl)methanone 2-amino-5-chlorophenyl)-(phenyl)methanone; (2-hydroxy-5-methyl-1,3-phenylene)-dimethanol; sodium nitrite; sulfamic acid; sodium hydroxide; and concentrated HCl were used as received without further purification.

Procedure: In a 500 ml round bottom flask equipped with a magnetic stirrer was added 9.92 g (42.8 mmol) of 2-amino-5-chlorophenyl)-(phenyl)methanone, 18 ml concentrated HCl, deionized water (100 ml), and absolute ethanol (200 ml). The reaction mixture was cooled to 0° C. and 3.15 g (45.7 mmol) sodium nitrite in 30 ml water was added dropwise over 30 minutes. The reaction mixture was stirred at 0° C. for an additional 40 minutes. 300 mg sulfamic acid (Aldrich, Milwaukee, Wis.) was added and the mixture was stirred for an additional 20 minutes. (2-hydroxy-5-methyl-1,3-phenylene)dimethanol (Aldrich) was dissolved in 200 ml deionized water and 200 ml ethanol. A solution of 12.4 g (310 mmol) NaOH in 100 ml water was prepared and approximately half was added to the (2-hydroxy-5-methyl-1,3-phenylene) dimethanol at 0° C. The diazonium mixture and remaining NaOH solution were added simultaneously to the (2-hydroxy-5-methyl-1,3-phenylene)dimethanol mixture over 60 minutes. The reaction mixture was stirred for 4 hours at room temperature and then poured into 3.5 L deionized water and acidified to pH 4-5 with 1 N HCl. The solid was filtered and rinsed with water. The solid was dried under high vacuum at 55° C. for 20 hours and 70° C. for 48 hours to afford 14.65 g (90%) of an orange solid). The product was not further purified. 1H NMR (CDCl$_3$) delta: 11.82 (s, 1H, phenol-OH), 7.95 (m, 1H, Ar—H), 7.84 (m, 2H, Ar—H), 7.62 (m, 3H, Ar—H), 7.48 (m, 3H, Ar—H), 7.16 (5, 1H, Ar—H), 4.63 (s, 2H, ArCH$_2$), 2.31 (s, 3H, ArCH$_3$).

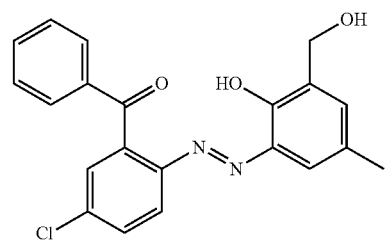 [SMILES: Cc1cc(CO)c(O)c(/N=N/c2ccc(Cl)cc2C(=O)c2ccccc2)c1]

Example 2

Synthesis of (E)-3-((2-benzoyl-4-chlorophenyl)diazenyl)-2-hydroxy-5-methylbenzyl methacrylate (1)

(5-chloro-2-((2-hydroxy-3-(hydroxymethyl)-5-methylphenyl)diazenyl)-phenyl)(phenyl)methanone was synthesized as in Example 1. Methacryloyl chloride, anhydrous pyridine, and concentrated HCl were used as received without further purification.

Procedure: In a 500 ml round bottom flask equipped with a magnetic stirrer was added 7.99 g (21.0 mmol) (5-chloro-2-((2-hydroxy-3-(hydroxymethyl)-5-methylphenyl)diazenyl)-phenyl)(phenyl)methanone from Example 1, 250 g THF, 36.0 g (455 mmol) pyridine, and 100 mg p-methoxyphenol. The mixture was cooled to −20-0° C. Methacryloyl chloride (3.00 g, 28.7 mmol) was added dropwise over 15 minutes. The reaction mixture was stirred for 1 hour at −20° C. and an additional 20 hours at ambient temperature. The solids were filtered and 500 ml diethyl ether was added to the mixture and then washed with 0.5 N NaHCO$_3$ (3×), 1 N HCl (3×), and water. The organic layer was dried over MgSO$_4$, filtered, and concentrated under reduced pressure to give a dark red oil which was recrystallized from ethanol to give 4 g (42%) of an orange solid. $^1$H NMR (CDCl$_3$) delta: 11.81 (s, 1H, phenol-OH), 8.03 (m, 1H, Ar—H), 7.86 (m, 2H, Ar—H), 7.70 (m, 1H, Ar—H), 7.58 (m, 1H, Ar—H), 7.52 (m, 4H, Ar—H), 7.23 (s, 1H, Ar—H), 6.12 (s, 1H, vinyl-H), 5.61 (s, 1H, vinyl), 5.18 (s, 2H, ArCH$_2$), 2.36 (s, 3H, ArCH$_3$), 1.97 (s, 3H, vinyl-CH$_3$).

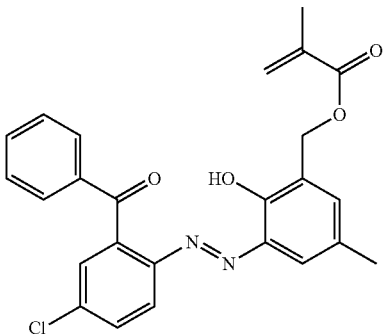

Example 3

IOL Formulation

Compound 1 from Example 2 was formulated as shown in Table 1. Rectangular test samples measuring 20×10×0.9 mm (length×width×thickness) were made via thermal curing using a 70° C.→110° C. cure cycle. In brief, samples were 1) ramp heated from ambient temperature to 70° C. over 15 minutes, 2) soaked at 70° C. for 1 hour, 3) ramp heated from 70° C. to 110° C. over 20 minutes, and 4) soaked at 110° C. for 2 hours, Cured samples were extracted in acetone for 20 hours at ambient temperature, dried slowly at ambient temperature for 20 hours, and then vacuum dried at low pressure (0.1 mm Hg) for a minimum of 20 hours at 70° C. The percent extractables of formulation 3A was 1.1±0.1%. The UV/Vis spectrum of 3A is shown in FIG. 1.

TABLE 1

| Component | Formulation 3A (% w/w) |
| --- | --- |
| PEA | 79.7 |
| HEMA | 15.2 |
| BDDA | 3.26 |
| WL-3 | 1.83 |
| Compound 1 | 0.03 |
| AIBN | 0.54 |

PEA = 2-phenylethyl acrylate
HEMA = 2-hydroxyethylmethacrylate
BDDA = butane-1,4-diyl diacrylate
WL-3 = 3-(2H-benzo[d][1,2,3]triazol-2-yl)-2-hydroxy-5-methoxybenzyl methacrylate
AIBN = 2,2'-(diazene-1,2-diyl)bis(2-methyl-propanenitrile)

This invention has been described by reference to certain preferred embodiments; however, it should be understood that it may be embodied in other specific forms or variations thereof without departing from its special or essential characteristics. The embodiments described above are therefore considered to be illustrative in all respects and not restrictive, the scope of the invention being indicated by the appended claims rather than by the foregoing description.

I claim:
1. A UV absorber compound of the formula:

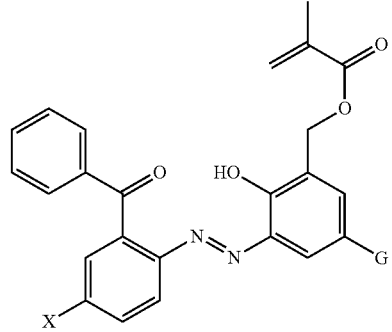

wherein
—X and G are independently H, F, Cl, Br, I, CO$_2$H, NO$_2$, C$_1$-C$_6$ linear or branched alkyl, or C$_1$-C$_6$ linear or branched alkoxy.

2. The UV absorber compound of claim 1, wherein
X is H, F, Cl, CH$_3$, or NO$_2$; and
G is H, F, Cl, CH$_3$, or CH$_3$O; provided that if X=H, then G≠H.

3. The UV absorber compound of claim 2, wherein X is Cl and G is CH$_3$.

4. An intraocular lens comprising the UV absorber compound of claim 3.

5. An intraocular lens comprising the UV absorber compound of claim 2.

6. An ophthalmic device material comprising the UV absorber compound of claim 1 and a device-forming monomer selected from the group consisting of acrylic monomers and silicone-containing monomers.

7. The ophthalmic device material of claim 6, wherein the ophthalmic device material comprises from 0.01 to 0.5 wt. % of the UV absorber compound of claim 1.

8. The ophthalmic device material of claim 7, wherein the ophthalmic device material comprises from 0.01 to 0.1 wt. % of the UV absorber compound of claim 1.

9. The ophthalmic device material of claim 6, wherein the ophthalmic device material comprises a device-forming monomer of formula [II]:

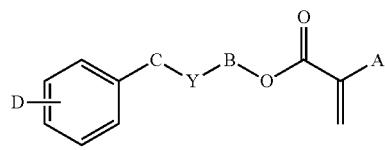

where in formula [II]:
A is H, CH$_3$, CH$_2$CH$_3$, or CH$_2$OH;
B is (CH$_2$)$_m$ or [O(CH$_2$)$_2$]$_z$;
C is (CH$_2$)$_w$;
M is 2-6;
z is 1-10;
Y is nothing, O, S, or NR', provided that if Y is O, S, or NR', then B is (CH$_2$)$_m$;
R' is H, CH$_3$, C$_n$H$_{2n'+1}$ (n'=1-10), iso-OC$_3$H$_7$, C$_6$H$_5$, or CH$_2$C$_6$H$_5$;
w is 0-6, provided that m+w≦8; and
D is H, C$_1$-C$_4$ alkyl, C$_1$-C$_4$ alkoxy, C$_6$H$_5$, CH$_2$C$_6$H$_5$ or halogen.

10. The ophthalmic device material of claim 9, wherein in formula [II]:
A is H or $CH_3$;
B is $(CH_2)_m$;
M is 2-5;
Y is nothing or O;
w is 0-1; and
D is H.

11. The ophthalmic device material of claim 10, wherein the ophthalmic device material comprises a monomer selected from the group consisting of: 2-phenylethyl methacrylate; 4-phenylbutyl methacrylate; 5-phenylpentyl methacrylate; 2-benzyloxyethyl methacrylate; and 3-benzyloxypropyl methacrylate; and their corresponding acrylates.

12. The ophthalmic device material of claim 6, wherein the ophthalmic device material comprises a cross-linking agent.

13. The ophthalmic device material of claim 6, wherein the ophthalmic device material comprises a reactive UV absorber compound other than a UV absorber compound of claim 1.

14. An ophthalmic device comprising the ophthalmic device material of claim 6.

15. The ophthalmic device of claim 14, wherein the ophthalmic device is selected from the group consisting of an intraocular lens; a contact lens; a keratoprosthesis; and a corneal inlay or ring.

16. An intraocular lens comprising the UV absorber compound of claim 1.

* * * * *